Oct. 9, 1956
W. C. PIERCE
2,765,891
PERMANENT MAGNET TORQUE PRODUCING DEVICE
Filed Feb. 8, 1954
2 Sheets-Sheet 2
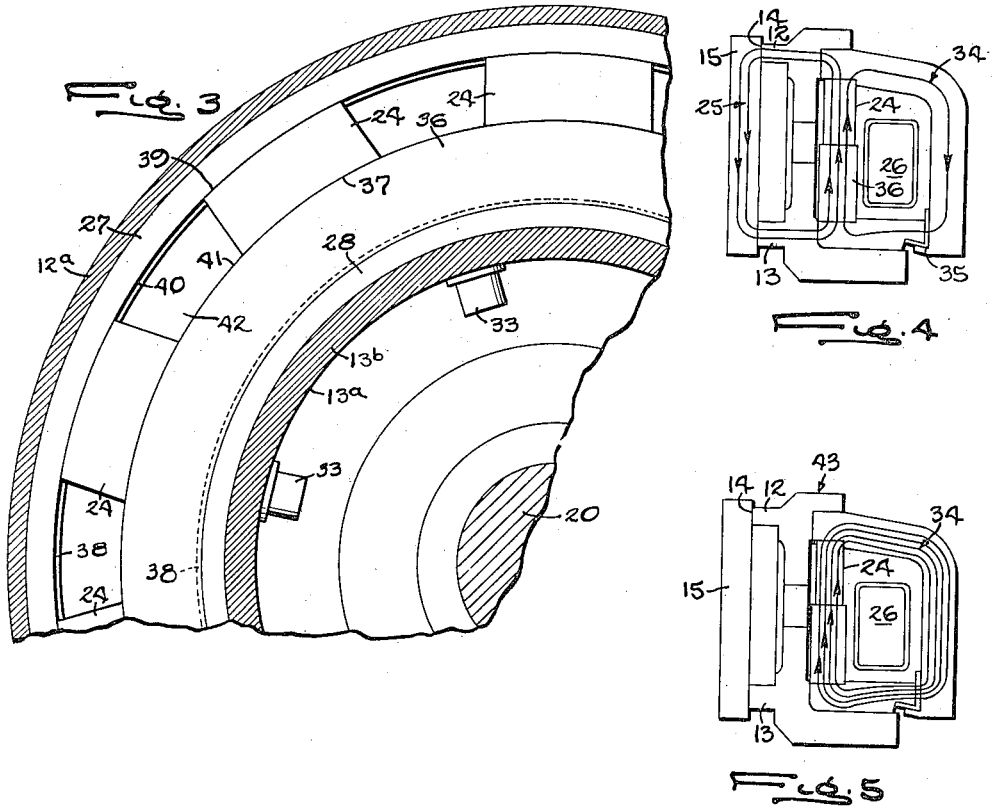
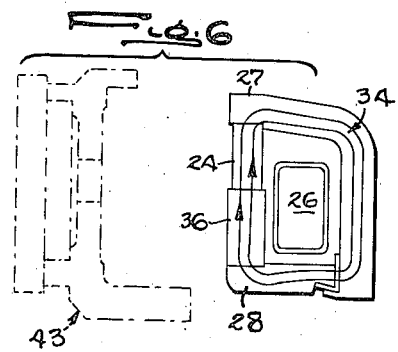
INVENTOR
William C. Pierce
By Carlson, Pitzner, Hubbard & Wolfe
ATTORNEY

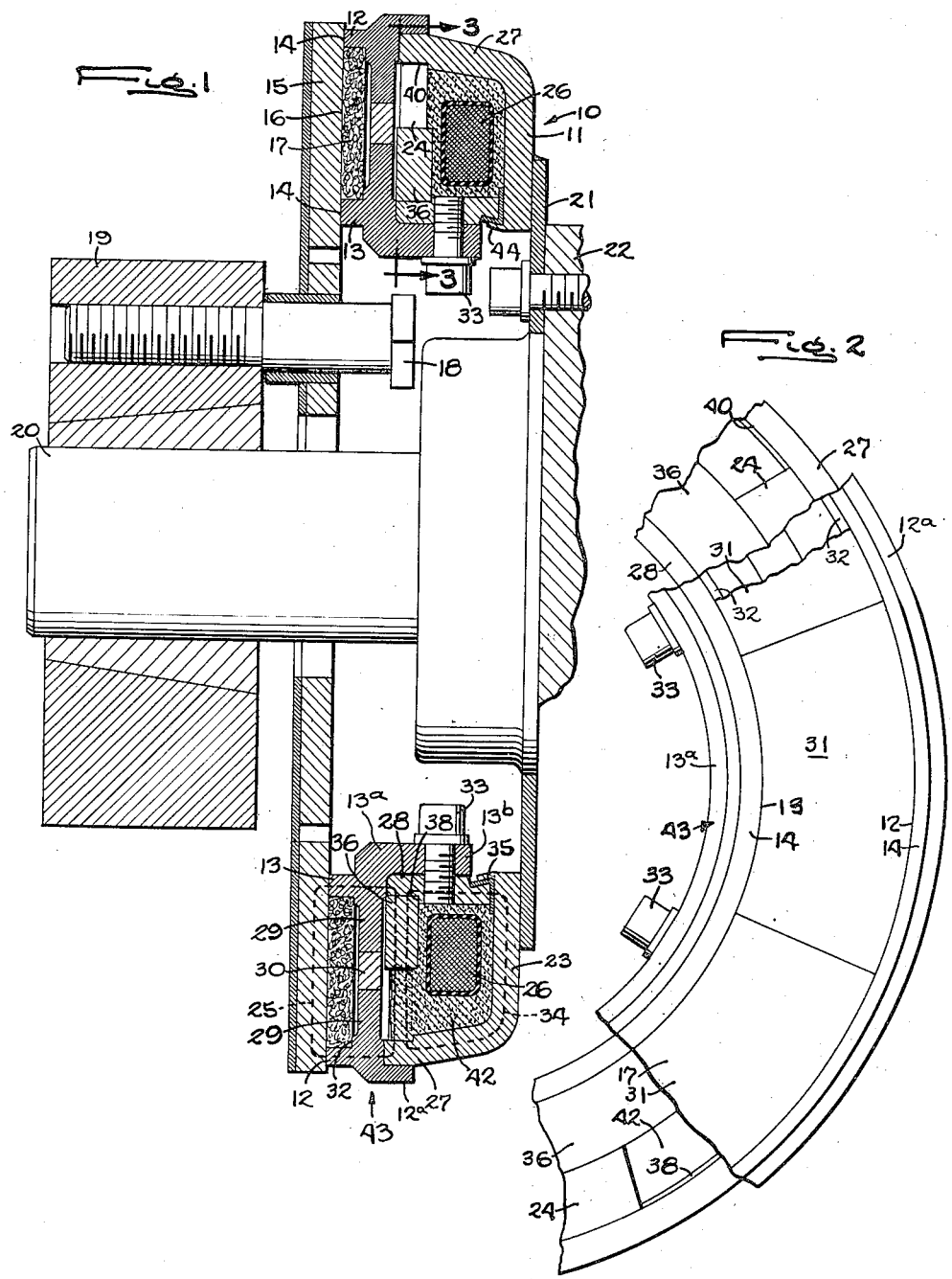

United States Patent Office 2,765,891
Patented Oct. 9, 1956

2,765,891

PERMANENT MAGNET TORQUE PRODUCING DEVICE

William C. Pierce, Beloit, Wis., assignor to Warner Electric Brake & Clutch Company, South Beloit, Ill., a corporation of Illinois Application February 8, 1954, Serial No. 408,671

6 Claims. (Cl. 192—84)

This invention relates generally to magnetic torque producing devices in which the active magnetic force for drawing magnet and armature elements into frictional gripping engagement is derived from a permanent magnet but is rendered ineffective by energization of an associated winding. The invention has more particular reference to devices in which the magnet core proper is an annulus of U-shaped cross section and the permanent magnet is a separately formed piece magnetically spanning the pole projections of the core.

Due to the expensive character and poor machineability of available permanent magnet materials, the cost of friction devices of the above character is considerably greater than similar coil controlled devices. The cost of replacing the permanent magnet device when the friction surfaces are worn out is proportionately high.

The primary object of the present invention is to prolong the service life of a permanent magnet friction device of the above character by forming the friction face of the magnet as a separate replaceable assembly, and this without danger of demagnetizing the permanent magnet when the assembly is removed for replacement.

A more detailed object is to avoid demagnetization of the permanent magnet when the replaceable friction parts are removed by providing two substantially closed paths for the permanent magnet flux, one being a main path extending through the magnet and the friction parts of the complete assembly, and the other, a by-pass path, remaining intact after separation of the friction parts so as to constitute a keeper circuit for insuring continuous threading of flux through the permanent magnet.

Other objects and advantages of the invention will become apparent from the following detailed description taken in connection with the accompanying drawings, in which Figure 1 is a diametrical cross sectional view of a magnetic torque device embodying the novel features of the present invention.

Fig. 2 is a fragmentary face view of the magnet member.

Fig. 3 is a fragmentary sectional view taken along the line 3—3 of Fig. 1.

Figs. 4, 5 and 6 are diagrammatic views illustrating the flux paths in the device under different conditions.

The invention is shown in the drawings for purposes of illustration embodied in a magnetic friction device including a magnet member 10 having a shell or core 11 of magnetic material of U-shaped cross section and radially spaced annular pole pieces 12 and 13 terminating in concentric axially facing pole faces 14. Bridging the latter is an armature 15 which is rotatable relative to the magnet member and is adapted for axial gripping engagement with the friction face 16 of the magnet member. An annular wear plate 17 of nonmagnetic friction material such as brake lining is seated between and secured to the pole pieces with its outer flat surface flush with the pole faces thereby forming the composite friction face 16.

In the form shown, the armature 15 is a flat ring of magnetic material spanning the pole faces 14 of the magnet member 10 and, in this instance, is supported for axial movement on a plurality of pins 18 angularly spaced around a supporting member 19 which is fast on a rotatable shaft 20. When the friction device is a brake as in the present instance, the magnet member 10 is stationarily mounted. This may be accomplished through the medium of a plate 21 secured to a stationary support 22 and fastened, as by welding, to a flat ring 23 which constitutes the back or closed end of the shell 11 and which is secured at its inner and outer peripheries to the outer ends of concentric annular legs or pole projections 27 and 28 to define the shell. Herein, the outer periphery of the end ring 23 is made integral with the outer pole projection 27 and the inner pole projection is formed as a separate part fastened rigidly in abutment with the inner edge of the end ring by a thin flange 44 on the end ring clenched around an undercut surface on the pole projection.

Magnetic flux for drawing the working faces of the magnet member 10 and the armature 15 into frictional gripping engagement is derived from a permanent magnet 24 arranged so that its flux threads a closed toroidal circuit (shown by the broken line 25 in Fig. 1 and indicated generally in Fig. 4) extending through the pole pieces 12 and 13 and axially back and forth between the armature and the pole faces 14 of the magnet member. To release the brake, an annular multiple turn winding 26 which is a part of the magnet member is energized to produce a magnetic potential across the pole faces opposing and effectually cancelling that of the permanent magnet.

During service use, the friction face 16 of the magnet member 10 wears off so that it is no longer serviceable and must be replaced. To reduce the number of parts which must be replaced to provide a new friction face, the pole pieces 12 and 13 and the wear plate 17 are formed separately from the shell 11 as a rigid unit or assembly 43 which is adapted to be secured detachably to the shell. In the present instance, the pole pieces 12 and 13 are the outer end portions of two concentric rings $12^a$ and $13^a$ whose inner end portions are disposed on the outer sides of and telescope closely with the outer and the inner concentric legs or pole projections 27 and 28 of the U-shaped shell 11 to provide substantially closed magnetic joints between the pole piece rings and the outer and inner shell legs respectively. Preferably, the rigid connection between the rings $12^a$ and $13^a$ is effected by a flat narrow ring 30 of copper or other nonmagnetic material magnetically separating the pole piece rings and secured as by brazing to radial flanges 29 projecting inwardly from the rings intermediate the ends thereof. Segments 31 (Fig. 2) of wear material constituting the wear plate 17 are disposed between the pole pieces 12 and 13 and are backed by shoulders 32 on the latter. The friction parts are secured to the shell by screws 33 threaded into the inner shell leg 28 and extending radially through an inner axial extension $13^b$ of the inner pole piece ring $13^a$.

Such removal and replacement of the friction parts of a device of the above character to reduce the cost of providing a new friction face 16 is made possible in accordance with the present invention by a novel arrangement of the permanent magnet 24 within the shell 11 to avoid demagnetization of the magnet when the replaceable friction assembly 43 is separated from the shell. For this purpose, the latter and the permanent magnet cooperate to define a second or auxiliary toroidal flux path 34 (Figs. 1, 4, 5 and 6) extending from the poles of the permanent magnet and around the closed end 23 of the shell and by-passing the pole pieces 12 and 13. The second flux path 34 thus constitutes a closed keeper circuit which is parallel to the main flux circuit 25 and remains intact during separation of the friction parts from the shell. Thus, the permanent magnet, after it has been assembled in the shell and magnetized initially, retains the desired magnetization during several changes of the friction parts in service use. To increase the reluctance of the by-pass circuit 34 over that of the main circuit 25 so that the major portion of the permanent magnet flux is useful flux threading the latter circuit and the armature 15, a thin ring 35 of non-magnetic material such as brass is interposed between the end ring 23 and the inner pole projection 28 of the shell.

To define the keeper flux circuit 34, the permanent magnet 24 is spaced from the closed end 23 of the U-shaped shell 11 and magnetically spans the outer and inner legs 27 and 28 thereof. Herein, the permanent magnet comprises a plurality of flat segments or bars spaced circumferentially around the shell and disposed radially adjacent the ends of the shell legs, the coil 26 being located within the shell and between the closed end of the latter and the magnet. Preferably, each bar is made shorter radially than the spacing between the shell legs to receive a flat annulus 36 which forms a part of the shell between the inner bar end 37 and the inner shell leg 28. To provide area contact and substantially closed magnetic joints between an inwardly facing surface 40 on the outer shell leg 27 and the outer bar end 39, between the inner bar end 37 and the outer periphery 41 of the annulus, and between the inner periphery of the annulus and the inner shell leg, each pair of opposed radially facing surfaces are sized accurately to fit in close abutment with each other. Axially facing shoulders 38 on the shell legs engage the annulus and the permanent magnet bars to locate the same in radial alinement adjacent the free ends of the legs. In this instance, the magnet bars are made of suitable permanent magnet material such as an aluminum-nickel-cobalt alloy while the pole piece rings 12a and 13a and the shell 11 including the annulus 36 are composed of low reluctance material such as ingot iron.

In the assembly of the magnet member 10 after the inner shell leg 28 has been secured to the end ring 23 of the shell, first the coil 26 is inserted between the shell legs and positioned adjacent the end ring. The annulus 36 then is pressed onto the inner shell leg and against the axially facing shoulder 38 thereon and the permanent magnet bars 24 are pressed axially between the radially opposed surfaces 40 and 41 and toward the closed end 23 of the U into engagement with the shoulder 38 on the outer shell leg. Next, with the shell 11 opening upwardly and the axis thereof disposed vertically, a suitable cement 42 in liquid state is poured into the shell and up to a level almost flush with the outer ends of the shell legs so as to fill the shell around the coil and the spaces between the magnet bars, the cement, when it hardens, serving to secure the magnet bars as well as the coil rigidly to the shell. After the cement 42 has hardened, the parts thus far assembled are secured in a suitable fixture (not shown) and a magnetomotive force of sufficient magnitude is applied across the shell legs 27 and 28 to magnetize the magnet bars 24. Finally, the magnet member is completed by telescoping the pole pieces 12 and 13 of the friction assembly 43 over the shell legs 27 and 28 and securing the same together by the screws 33.

Assuming that the parts of the torque device described above are assembled and the coil 26 is deenergized, flux from the permanent magnet 24 will be divided between the main flux path 25 through the pole faces 14 and the armature 15 and the auxiliary path 34 as indicated by the arrowed lines in Fig. 4 in amounts proportional to the values of the reluctance of the two circuits. Due to the location of the nonmagnetic ring 35 in the auxiliary flux path 34, the reluctance of the latter is greater than that of the main path 25 so that the major portion of the permanent magnet flux is useful flux threading the main path and the armature 15 to draw the latter into axial gripping engagement with the friction face 16. Upon energization of the coil 26, the magnetomotive force resulting therefrom across the pole faces 14 opposes the permanent magnet flux and substantially cancels the latter or, stated another way, diverts the permanent magnet flux into the auxiliary path 34. Under this condition which is shown in Fig. 5, no flux threads the main path 25 and the armature 15 is released.

When the friction face 16 becomes worn so that it is no longer serviceable, the screws 33 are removed permitting the friction assembly 43 to be slid axially off from the shell 11. At this time, the permanent magnet flux threads the auxiliary circuit 34 which, since it by-passes the pole pieces 12 and 13, remains closed when the friction assembly is separated from the shell. Under this condition which is shown in Fig. 6, the permanent magnet retains sufficient magnetization to draw the armature 15 into engagement with the new wear surface and produce the desired torque after a new friction assembly 43 has been mounted on the shell and fastened to the latter by the screws.

From the foregoing, it will be apparent that the novel coaction of the permanent magnet 24 and the shell 11 in defining a keeper circuit 34 which by-passes the replaceable pole pieces 12 and 13 makes it possible to separate the friction parts of the magnet member 10 into an easily replaceable unit. Thus, the more expensive parts of the magnet member, particularly the permanent magnet 24, may be retained for use with several sets of friction parts.

I claim as my invention:

1. A magnetic friction device having, in combination, a rigid shell of magnetic material of U-shaped cross section having radially spaced inner and outer concentric legs, a plurality of permanent magnets comprising bars angularly spaced around said shell between said legs and magnetically spanning the latter at points spaced from the closed end of the U, a pair of annular concentric pole pieces secured rigidly together in concentric relation and magnetically separated from each other, said pole pieces projecting axially from and beyond the ends of said rings to provide axially facing pole faces, means for detachably securing said pole pieces to said shell to provide substantially closed magnetic joints between the pole pieces and said inner and outer legs respectively, and an armature spanning said pole faces and adapted for frictional gripping engagement therewith, said armature, said shell, said pole pieces, and said permanent magnets cooperating to define a first toroidal flux path extending from the poles of the magnets and through said pole pieces and said armature and a second parallel toroidal flux path extending from the magnet poles and around the closed end of the U-shaped shell to by-pass said pole pieces and provide a keeper circuit permitting removal of the pole pieces from the shell without demagnetizing the permanent magnets.

2. In a magnetic friction device, the combination of, a rigid shell of magnetic material of U-shaped cross section having inner and outer concentric legs, a permanent magnet disposed between said legs and cooperating with said shell to define a first flux path of toroidal shape extending from the poles of the magnet and around the closed end of the U, inner and outer annular pole pieces of magnetic material magnetically separated from each other and secured rigidly together in concentric relation, said inner and outer pole pieces projecting axially from and beyond the ends of said inner and outer legs respectively to provide extensions of the latter terminating in concentric axially facing friction faces, and means for detachably fastening said inner and outer pole pieces to said shell to provide magnetic joints between the pole pieces and said inner and outer rings respectively and define a second flux path extending from the poles of said permanent magnet and through the pole pieces, said first flux path by-passing said pole pieces and constituting a keeper circuit for said permanet magnet to avoid demagnetization of the latter when said pole pieces are removed and replaced following wearing off of the friction faces thereof.

3. In a permanent magnet torque producing device, the combination of, an annular magnet core of U-shaped cross section having radially spaced pole projections, a winding disposed within said core adjacent the closed end thereof, a permanent magnet spanning said projections adjacent the outer ends thereof and cooperating with said core to provide a closed by-pass flux circuit, a replaceable wear face assembly comprising two concentric rings of magnetic material magnetically separated from each other but rigidly joined together, said rings having friction faces at their outer ends, and means for securing said assembly and said core together to provide substantially closed magnetic joints between said inner and outer rings and the respective pole projections, said rings, the end portions of said projections and said magnet, when said friction faces are spanned by an armature, providing a main flux circuit of substantially lower reluctance than said by-pass circuit.

4. In a permanent magnet torque producing device, the combination of, an annular magnet core of U-shaped cross section having radially spaced pole projections, a permanent magnet spanning said projections and cooperating with said core to provide a closed by-pass flux circuit, a replaceable wear face assembly comprising two concentric rings of magnetic material magnetically separated from each other but rigidly joined together, said rings having friction faces at their outer ends, and means for securing said assembly and said core together to provide substantially closed magnetic joints between said inner and outer rings and the respective pole projections, said rings, the end portions of said projections and said magnet, when said friction faces are spanned by an armature, providing a main flux circuit of substantially lower reluctance than said by-pass circuit.

5. In a magnetic friction device, the combination of, a rigid shell of magnetic material having concentric inner and outer annular pole projections, a permanent magnet disposed within said shell and cooperating therewith to define a closed flux path of toroidal shape extending from the poles of the magnet and around the shell, a replaceable pole piece section including an annular pole piece of magnetic material extending axially from and beyond one end of one of said projections and terminating at its outer end in a friction face exposed for axial gripping engagement with an armature, and means for detachably securing said replaceable section to said shell, said section and said shell defining a second flux path extending from said permanent magnet and through said shell to said friction face and said closed flux path constituting a keeper circuit to avoid demagnetization of said permanent magnet when said replaceable section is separated from said shell.

6. In a magnetic friction device, the combination of, a rigid shell of magnetic material having concentric inner and outer annular pole projections, a permanent magnet disposed within said shell and cooperating therewith to define a closed flux path of toroidal shape extending from the poles of the magnet and around the shell, a replaceable pole piece section including an annular pole piece of magnetic material extending axially from and beyond one end of one of said projections and terminating at its outer end in an exposed friction face, an armature supported for axial movement relative to said face and into axial gripping engagement therewith, and means for detachably securing said replaceable section to said shell, said armature, said shell and said section defining a second flux path extending from said permanent magnet and through said friction face and said armature and said closed flux path constituting a keeper circuit to avoid demagnetization of said permanent magnet when said replaceable section is separated from said shell.

References Cited in the file of this patent

UNITED STATES PATENTS

| | | |
|---|---|---|
| 2,188,803 | Boehne | Jan. 30, 1940 |
| 2,650,684 | English et al. | Sept. 1, 1953 |

FOREIGN PATENTS

| | | |
|---|---|---|
| 1,013,159 | France | Apr. 30, 1952 |